United States Patent Office 3,838,009
Patented Sept. 24, 1974

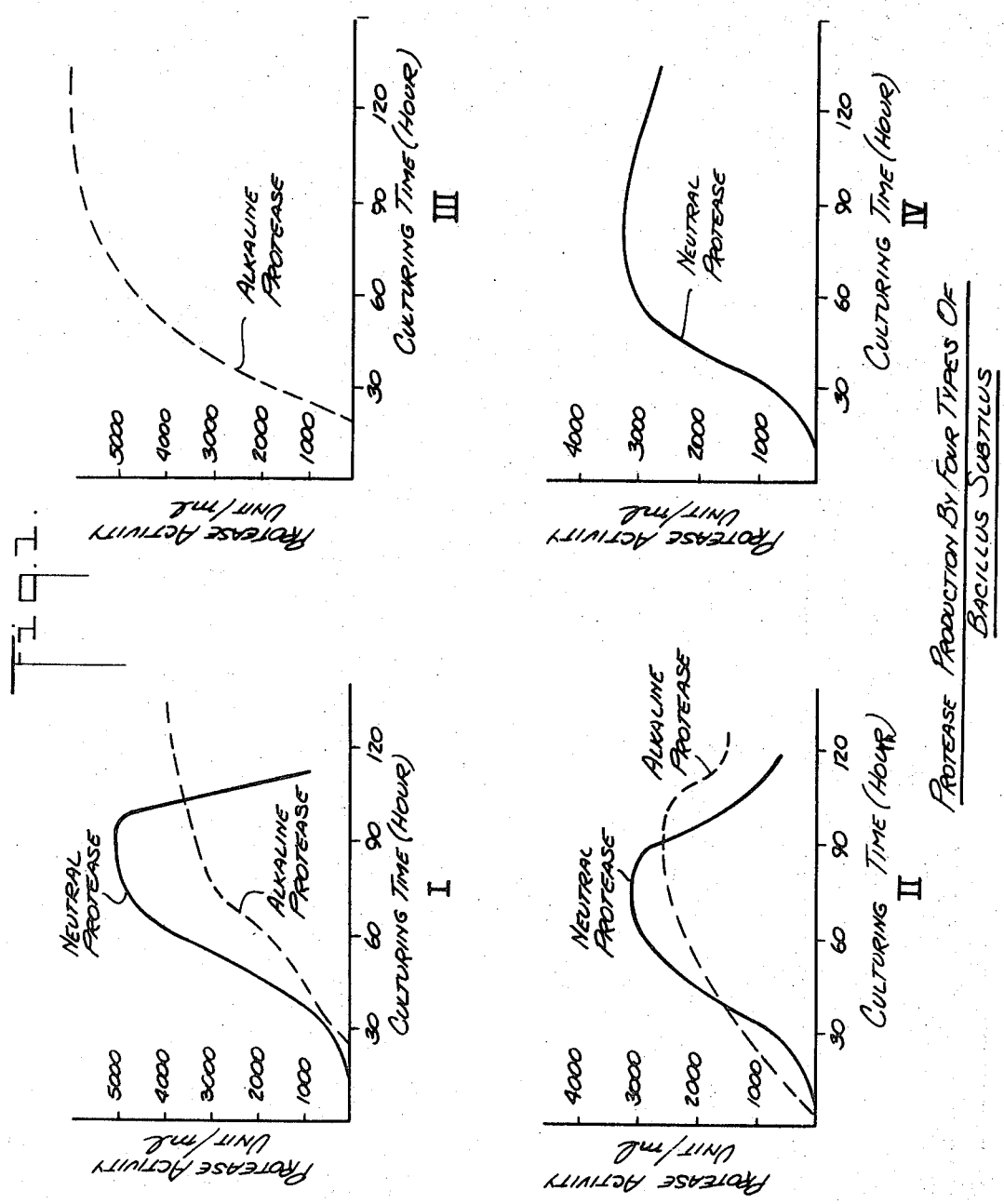

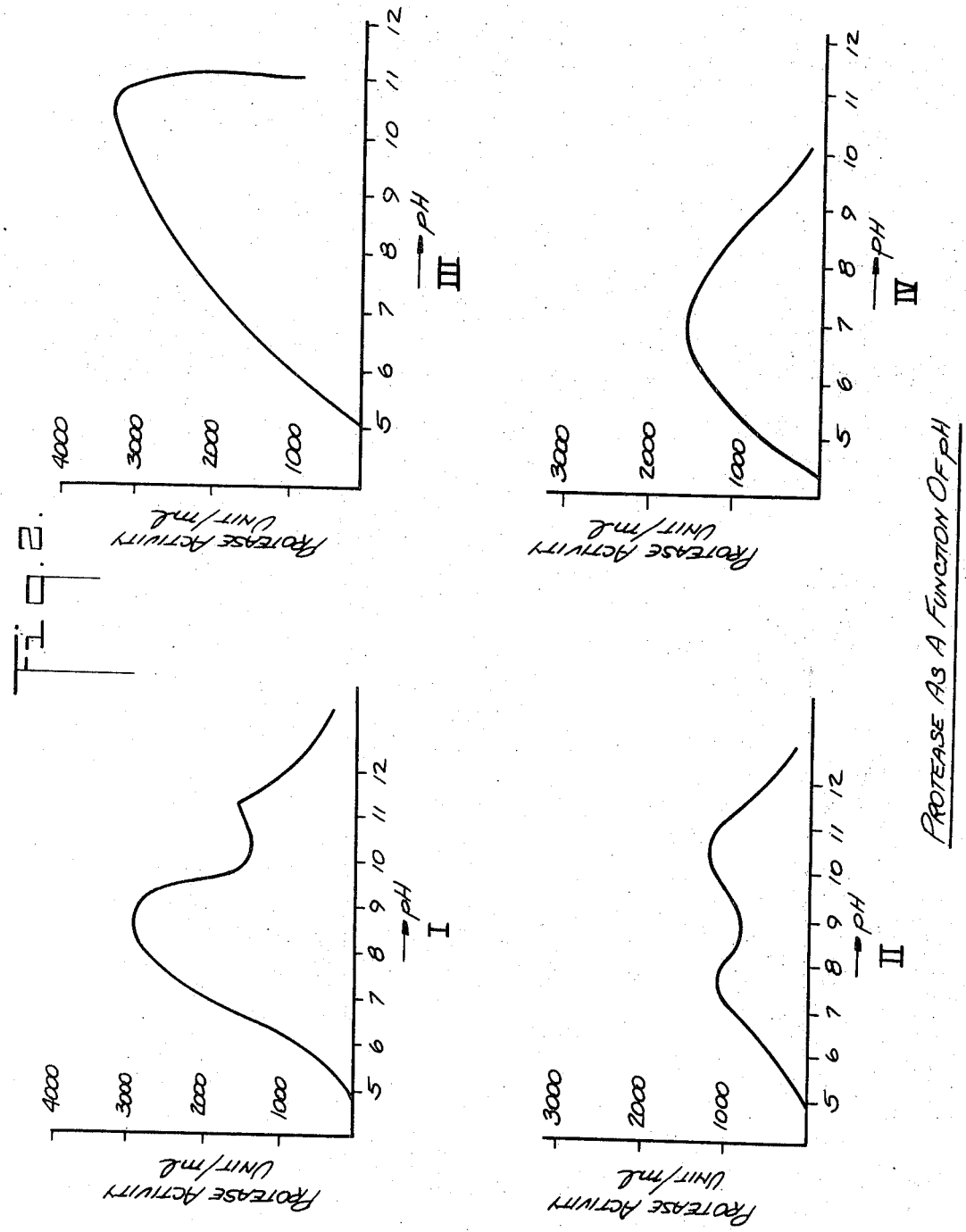

3,838,009
PROCESS FOR PRODUCING DETERGENT RESISTING ALKALINE PROTEASE
Jyuichiro Fukumoto, Takarazuka, Takehiko Yamamoto, Amagasaki, and Daisuke Tsuru, Sakai, Japan, assignors to Kyowa Hakko Kogyo Co., Ltd.
Continuation of abandoned application Ser. No. 864,452, Oct. 7, 1969. This application Aug. 16, 1972, Ser. No. 280,959
Claims priority, application Japan, Oct. 25, 1968, 43/78,189
Int. Cl. C12d 13/10
U.S. Cl. 195—65         1 Claim

ABSTRACT OF THE DISCLOSURE

The process for producing alkaline protease which comprises culturing in a suitable medium a strain of *Bacillus subtilis*, which strain has the ability to grow in a nutrient medium in the presence of sodium lauryl sulfate, the presence of sodium lauryl sulfate is not required in the fermentation medium, however.

---

This is a continuation of application Ser. No. 864,452, filed Oct. 7, 1969, now abandoned.

The present invention relates to a process for producing detergent-resistant alkaline protease. More particularly, it relates to a process for producing detergent-resistant alkaline protease which comprises culturing a microorganism belonging to the genus *Bacillus* in a medium containing a suitable amount of carbohydrate, a nitrogen source, inorganic salts and other nutrients.

Most of the presently commercially available bacterial protease enzymes are produced by culturing *Bacillus subtilis*, and most of this protease has been obtained as a by-product from amylase production. Many strains of *Bacillus subtilis* produce both neutral and alkaline protease. However, since neutral protease is a generally unstable enzyme, only the alkaline protease has been employed in the food industry, leather tanning, fiber industry, etc. Recently, enzymatically active mixtures of detergents and alkaline protease have appeared as commercial products.

The present invention relates to a process for producing detergent-resistant alkaline protease which comprises culturing particular, selected strains of *Bacillus subtilis* obtained from the soil or various processed foodstuffs. In accordance with this invention, it is possible to produce alkaline protease which is remarkably stable and retains enzymatic activity in the presence of various kinds of surface active agents and which is obtained in high yield.

Proteins generally have the ability to form complexes with surface active agents. For example, invertase and bacterially produced α-amylase form a crystalline complex with surface active agents without losing their enzymatic activity. A process for producing a very pure, effective enzyme has been developed by utilizing this property (Negoro, Biochemical, Vol. 32, pages 306–327 (1960)). Additionally, the heat resistance of enzyme can be improved by combination with surface active agents under certain conditions as described in Japanese Pat. No. 483,896 to Fukumoto and Negoro. It is also possible to utilize surface active agents for enzyme purification by combining them under conditions under which only the impure protein is precipitated. However, protease, unlike other enzymes, generally loses its enzymatic activity when treated with ionic surface active agents.

The present invention is based upon a study of the production of protease by *Bacillus subtilis*. As a result of this study, it has been found that different strains of *Bacillus subtilis* are capable of producing protease having quite different properties (Agricultural and Biological Chemistry, Vol. 30, pages 651–658, 856–862, 1,164–1,169 and 1,261–1,268 (1966), Vol. 31, pages 330–335, and 718–723 (1967)). At the same time, it has been found that alkaline protease which is produced from certain selected strains of *Bacillus subtilis* shows a strong resistance to deactivation by all types of surface active agents.

As shown in FIG. 1 and FIG. 2, strains of *Bacillus subtilis* can be classified into four types based on their production of protease. The first type is that generally observed with amylase-producing strains of *Bacillus subtilis*. These strains have a pronounced ability to produce neutral protease, and can secrete alkaline protease only at a later stage of cultivation (FIG. 1–I, FIG. 2–I), and then neutral protease gradually disappears as the alkaline protease is produced. Under these circumstances, the amount of alkaline protease accumulated is relatively low. The second type can produce both alkaline and neutral proteases at the same time, and in this case the decrease in enzyme activity occurs in a comparatively short time because of the effect each protease exerts on the other (FIG. 1–II, FIG. 2–II). The third type of *Bacillus subtilis* can produce only alkaline protease, and in this case a remarkable amount of alkaline protease accumulates because of the lack of interaction between two proteases. This type includes the strains of *Bacillus subtilis* isolated and employed in the present invention (FIG. 1–III, FIG. 2–III). *Bacillus subtilis* strains of the fourth type produce neutral protease only (FIG. 1–IV, FIG. 2–IV).

The protease activity described above was determined by the following procedure. To 5 ml. of 0.6% casein was added one ml. of enzyme solution held at 30° C. After ten minutes, the reaction was stopped by adding 5 ml. of a trichloroacetic acid mixture containing 36 ml. of 50% (w.v.) trichloroacetic acid solution, 220 ml. of 1 M sodium acetate solution, 330 ml. of 1 M acetic acid solution in total volume of 1000 ml. The unreacted casein was precipitated, and the resulting precipitate was filtered off using Toyo filter paper No. 6. The optical density of the filtrate was measured at 275 mμ against a substrate blank. The blank was prepared by adding 5 ml. of the trichloroacetic acid mixture to 1 ml. of enzyme solution, then adding the casein and incubating at 30° C. for 10 minutes. A unit of enzyme activity was defined as the enzyme quantity which liberated TCA-soluble materials equivalent to 10γ tyrosine per 10 minutes. The pH response curves of FIG. 2 were obtained by following the above procedure with the exception that the appropriate pH is obtained through the use of buffer.

Enzyme activity is determined as a result of the effect that the enzyme has on casein. When the casein is hydrolyzed by the enzyme in the above procedure, a quantity of tyrosine is liberated in addition to other amino acids. The amount of tyrosine liberated is therefore a measure of the activity of the enzyme. This can easily be related to a specific amount of pure tyrosine by using UV absorption characteristics. For example, tyrosine has a specific absorption at 275 mμ. The difference between the absorption of the test material and the blank, compared to a known amount of tyrosine (e.g., 10γ) at this wave length is then a measure of the activity of the enzyme.

The organisms used in the present invention are strains of *Bacillus subtilis* which possess the property of being able to grow in the presence of sodium lauryl sulfate. This provides a simple and direct expedient for isolating appropriate strains. The normal sources and procedures for obtaining known *Bacillus subtilis* organisms as described in the literature are employed to isolate the strains operable in the invention with the added proviso that the isolated strains must possess, as a property, the ability to grow in the presence of sodium lauryl sulfate. This is not to say, however, that the medium used for production of the alkaline protease must contain sodium lauryl sulfate.

Representative strains described in the examples are on deposit with the American Type Culture Collection, Rockville, Md., and are freely available to the public.

In Table 1, five typical samples of purified *Bacillus subtilis* protease are compared with respect to optimum pH, optimum temperature, stability of pH and resistance to various inhibitors. As shown in the table, *Bacillus subtilis* alkaline protease (alkaline protease III) produced by *Bacillus subtilis* strains belonging to the above-described third type and isolated according to the present invention exhibits remarkable resistance against inhibition by surface active agents, either ionic or nonionic. This resistance is not found in the neutral or alkaline protease produced by *Bacillus subtilis* strains of the first, second or fourth types (neutral protease I and II, alkaline protease I, II). The properties of resistance to inhibition by surface active agents and high activity and stability under alkaline conditions are highly desirable for enzymes used in laundry and detergent products.

TABLE 1

[Comparison of properties of proteases produced by different strains of *Bacillus subtilis*]

|  | Neutral protease | | Alkaline protease | | |
| --- | --- | --- | --- | --- | --- |
|  | I | II | I | II | III |
| Optimum pH | 6.8–7.3 |  | 7.0 | 10.3–10.7 | 10.3–10.7 | 10.5–11.0 |
| Stable pH range | 6–9.5 |  | 6–10 | 5.5–10.8 | 5.5–10.8 | 5.5–11.2 |
| Optimum temperature (15 minutes reaction), °C | 55 | 52 | 55 | 55 | 55 |
| Heat resistance (under Ca existence), °C | 50 | 50 | 50 | 50 | 50 |

Influence of inhibitor (relative residual activity* after one hour incubation at pH 7.5 and 30° C.)

|  | Neutral protease | | Alkaline protease | | |
| --- | --- | --- | --- | --- | --- |
|  | I | II | I | II | III |
| EDTA ($5 \times 10^{-4}$M) | 0 | 0 | 98 | 98 | 98 |
| DFP ($2.5 \times 10^{-4}$M) | 100 | 100 | 40 | 55 | 2 |
| PPI (0.05%) | 100 | 100 | 14 | 18 | 1 |
| CuSO$_4$ ($5 \times 10^{-3}$M) | 5 | 15 | 75 | 98 | 90 |
| HgCl$_2$ ($5 \times 10^{-3}$M) | 3 | 8 | 12 | 17 | 40 |
| Tween 20 (0.5%) | 85 | 90 | 100 | 100 | 100 |
| Triton X-100 (0.05%) | 92 | 94 | 96 | 98 | 98 |
| SLS (0.2%) | 0 | 0 | 59 | 0 | 93 |
| BKCL (0.2%) | 0 | 0 | 42 | 38 | 67 |
| ABS ($5 \times 10^{-3}$M) | 0 | 0 | 40 | 30 | 70 |

*Relative activity: Each original enzyme solution was diluted to a concentration of 100 μ/ml. with cold water, held at 30° C. for one hour as a control. These controls were assigned an activity of 100 for the purpose of comparing the activity remaining after treatment with the various inhibitors.

NOTE.—EDTA=Ethylenediaminetetraacetic acid; DFP=Diisopropylfluorophosphate; PPI=Protease inhibitor from potato; SLS=Sodium lauryl sulfate; BKCL=Benzalkonium chloride; ABS=Alkylbenzenesulfonate; Tween 20=Polyoxyethylene sorbitan monolaurate; Triton X-100=Isooctylphenyl polyethoxy alcohol; Neutral protease I and alkaline protease I: separated and purified individually from culture liquid medium of Bac. subtilis Var. amyloliquefaciens Fukumoto; Neutral protease II and alkaline protease II: separated and purified individually from culture liquid medium of Bac. subtilis Var. amyloaccharticus Fukumoto.

Furthermore, *Bacillus subtilis* strains belonging to the third type, unlike the other strains, grow very well in a medium to which there has been added sodium lauryl sulfate (SLS) in a final concentration of 0.15%, and can produce same amount of protease, whether SLS is added to the medium or not. Accordingly, by utilizing the above properties, as disclosed in Table 1, alkaline protease-producing strains belonging to *Bacillus subtilis*, the said strains have a resistance against not only SLS but also many other detergents, can be isolated and screened without difficulty. In this invention process, though a cultivation was carried out by using *Bacillus subtilis* belonging to the above third type in the medium, it was available either liquid or solid. Usually a liquid medium was preferable, and in this case cultivation was carried out with either shaking or aerating.

The medium should contain a carbon source, a nitrogen source and the other various necessary nutrients for the particular strain, all in forms which *Bacillus subtilis* can utilize. Examples of suitable carbon sources include carbohydrates such as starch, dextrin, cane sugar, lactose, maltose, dextrose, fructose, blackstrap molasses and wood sugar wastes, etc. Suitable nitrogen sources include ammonium salts, urea, peptone, meat extract, casamino acid, corn steep liquor, soybean meal, casein, wheat bran and sugar, etc. Moreover, as a fermentation promoter, yeast extract, dry yeast, vitamins, etc. may be added. Inorganic salts, such as phosphates, magnesium salts, calcium salts, potassium salts, sodium salts, ferrous salts, manganese salts, zinc salts, etc. can be used. The optimum fermentation temperature is about 25–40° C. The optimum pH is 5.5–8.5, and the cultivation is generally carried out for about 20–72 hours.

Alkaline protease produced according to this invention can be precipitated and concentrated by adding organic solvents such as acetone and alcohol in the amount of about 50–65% (v./v.), or by adding salts such as ammonium sulphate, sodium sulfate, calcium chloride or sodium chloride is the amount of about 40–70% (v./v.). In the case of solid cultivation, the solvent or salt is added to an aqueous extract, and in the case of liquid cultivation, it is added to the culture filtrate. The protease can be purified easily by conventional methods such as adsorption and desorption, or ion-exchanger-resins, etc. The following examples illustrate practice of the present invention.

EXAMPLE 1

A seed culture was obtained by culturing *Bacillus subtilis* NSI (ATCC No. 21415) in a soybean cake alkaline-extracted liquid medium (containing 5% extracted soybean cake, 3% dextrin, 1% ammonium phosphate, 0.03% KCl, and 0.02% MgSO$_4$·7H$_2$O) at 35° C. for 2 days with prepropagation (culturing with shaking). The main cultivation was carried out by using the above seed culture in the above medium with shaking at 37° C. The amplitude of the shaking was 8 cm., 120–180 returns per minute, and the amount of medium was 50 ml. per 500 ml. of Sakaguchi flask.

After about 20 hours, alkaline protease began to be produced and reached a maximum (13,000 unit/ml.) after 50 hours. During the cultivation, the pH rose from 7.0 to 8.0. In the liquid outline medium, a small amount of amylase (0.5–1.0 unit/ml.) and a very small amount of hemicellulase were observed in addition to the alkaline protease. However, no neutral protease or cellulase activity was found.

At the end of the cultivation, 10.1 of medium was adjusted to give a final concentration of 0.05 M calcium salt by adding water-soluble calcium salt, and adjusting to pH 8.0 with 1 N caustic soda, and the resulting precipitate was removed by centrifuging. Since a small amount of mucuous-like material was found in the filtrate, to the filtrate was added benzoalkonium chloride to give a final concentration of 0.2%. After standing for 2 hours the resulting precipitate was removed. Alkaline protease was precipitated by adding ammonium sulphate to the filtrate to a final concentration of 70% saturation. After standing overnight in the cold, the resulting precipitate was collected by centrifuge, filtrated and dried. After partial purification by salting out about 500 gm. of preparates having an enzyme activity of 200,000 u./ml. was recovered.

EXAMPLE 2

*Bacillus subtilis* A (ATCC No. 21416) was used as the strain. A seed culture obtained by the same method as Example 1 was inoculated in 500 ml. of flask containing 50 ml. of the following fermentation medium in ratio of 10% (by volume), and cultivation was carried out for 40 hours as in Example 1. As a result, the activity of alkaline protease in the liquid medium reached at 10,000 u./ml.

Composition of fermentation medium:

| | Percent |
|---|---|
| Glucose | 1 |
| Soluble starch | 5 |
| Soybean meal | 1 |
| Ammonium phosphate | 0.5 |
| $MgSO_4 \cdot 7H_2O$ (pH 7.0) | 0.05 |

To the culture broth was added calcium chloride to a final concentration of 0.05 M and the pH was adjusted to 8.0 by adding 1 N caustic soda. After that, the resulting precipitate was removed by centrifugation, the filtrate cooled to 4° C., and two volumes of cold acetone added to the filtrate, and then kept in the cold for 4 hours. The precipitate was collected by centrifuge, washed twice with cold acetone and dried in vacuo. A yellowish-brown coloured dry powder was recovered. The recovery ratio was 88%, and the specific activity (protease unit per mg. of protein) rose 3 times as much.

EXAMPLE 3

This example was carried out by following the procedure of Example 2, except that *Bacillus subtilis* M (ATCC No. 21417) was used. The activity of alkaline protease reached 8,000 u./ml. at 40 hours.

EXAMPLE 4

This example was carried out by following the procedure of Example 2, except that *Bacillus subtilis* N (ATCC No. 21418) was used. The activity of alkaline protease reached 7,000 u./ml. at 40 hours.

What is claimed is:

1. A process for producing alkaline protease having an optimum pH range of 10.5 to 11.0, a stable pH range of 5.5 to 11.2 and an optimum temperature of 55° C.; having a resistance to inhibition by surface active agents and a relative residual activity of:

| | |
|---|---|
| 0.5% polyoxyethylene sorbitan monolaurate solution | 100 |
| 0.5% isooctylphenyl polyethoxy alcohol solution | 98 |
| 0.2% sodium lauryl sulfate solution | 67 |
| $5 \times 10^{-3}$ M alkylbenzenesulfonate solution | 70 | which comprises culturing a microorganism selected from the group consisting of *Bacillus subtilis* ATCC 21415, ATCC 21416, ATCC 21417 and ATCC 21418 in a nutrient medium; accumulating said alkaline protease in said medium and isolating said alkaline protease therefrom.

References Cited

UNITED STATES PATENTS

| | | | |
|---|---|---|---|
| 3,576,719 | 4/1971 | Murao | 195—62 |
| 3,723,250 | 3/1973 | Aunstrup et al. | 195—65 |

OTHER REFERENCES

Maxatase: Royal Netherlands Fermentation Industries, May 1967.

LIONEL M. SHAPIRO, Primary Examiner

U.S. Cl. X.R.

195—62; 252—Dig. 12